United States Patent [19]

Van Der Heijden et al.

[11] Patent Number: 5,783,247

[45] Date of Patent: Jul. 21, 1998

[54] FLAVORING COMPOSITION CONTAINING OXIDIZED TRIGLYCERIDE FATS, FATTY ACIDS, OF FATTY ACID DERIVATIVES

[75] Inventors: Arnoldus Van Der Heijden, 's Gravenzande; Graham Andrew Cross, Rotterdam; Krijn Mostert, Vlaardingen; David Simon Bot, Utrecht; Matthias Berger, Rotterdam, all of Netherlands

[73] Assignee: Van Den Berg Foods Co., Division of Conopco, Inc., New York, N.Y.

[21] Appl. No.: 578,705

[22] PCT Filed: Jun. 20, 1994

[86] PCT No.: PCT/EP94/02026

§ 371 Date: Dec. 28, 1995

§ 102(e) Date: Dec. 28, 1995

[87] PCT Pub. No.: WO95/01106

PCT Pub. Date: Jan. 12, 1995

[30] Foreign Application Priority Data

Jul. 2, 1993 [EP] European Pat. Off. ............ 93201933

[51] Int. Cl.$^6$ ..................................... A23L 1/221
[52] U.S. Cl. .................. 426/650; 426/534; 426/601; 554/134; 554/142; 554/143
[58] Field of Search ..................... 426/601, 650, 426/520, 492, 534; 554/134, 142, 143, 224

[56] References Cited

U.S. PATENT DOCUMENTS 5,178,892  1/1993  Simmons et al. ................ 426/533

FOREIGN PATENT DOCUMENTS

| 172 275 | 2/1986  | European Pat. Off. . |
| 295 509 | 12/1988 | European Pat. Off. . |
| 298 552 | 1/1989  | European Pat. Off. . |
| 377 239 | 7/1990  | European Pat. Off. . |
| 463 660 | 1/1992  | European Pat. Off. . |

*Primary Examiner*—Donald E. Czaja
*Assistant Examiner*—Steven B. Leavitt
*Attorney, Agent, or Firm*—Gerard J. McGowan

[57] ABSTRACT

Process for preparing a flavoring composition suitable as a butter flavor block by subjecting triglyceride fats, fatty acids or fatty acid derivatives to oxidizing conditions, comprising:

(a) admixing an anti-oxidant to triglyceride fats, fatty acids or fatty acid derivatives at least to a concentration which is sufficient to increase the induction period of the fat by a factor of 1.5, (b) heating the mixture for 0.5 hours–1 week at 50°–150° C. under access of atmospheric oxygen and in the presence of water, under the condition that the triglyceride fats, fatty acids or fatty acid derivatives contain at least one poly-unsaturated fatty acid with an omega-3 non-conjugatable double bond system in an amount of >0.01 wt. %. Such fatty acids or derivatives of fatty acid are preferably obtained by partially hydrogenating a natural vegetable glyceride fat.

27 Claims, 3 Drawing Sheets

(CH$_2$)$_6$COOR

↓ cat.

(CH$_2$)$_6$COOR

↓ H$_2$ (CH$_2$)$_6$COOR

+

(CH$_2$)$_6$COOR

FLAVORING COMPOSITION CONTAINING OXIDIZED TRIGLYCERIDE FATS, FATTY ACIDS, OF FATTY ACID DERIVATIVES

The present invention relates to a flavouring composition, a process for preparing such composition, the use of such composition for flavouring food products and the resulting flavoured food products. The term flavour in this respect indicates both the aroma'and the taste impression.

The use of flavouring compositions for flavouring food products is well known in the art. In general such compositions are prepared by mixing separate flavour compounds or flavour components. But when such flavouring compositions are used to imitate a known food flavour, e.g. the flavour of butter, the sensory effect generally does not fully mimic the targeted flavour.

One widely used application of flavouring compositions is the imitation of the flavour of natural butter. Adding some butter or butterfat to food products, such as margarine, is a well known method to impart to these food products the much appreciated flavour of butter. European Patent EP 0 298 552 furthermore discloses that a balanced butter flavour can be imparted to food products by adding butterfat which has been subjected to an oxidation treatment. A flavoured food product is prepared by incorporating into a food product at least 0.05 wt. % of such oxidized butterfat having an n-pentanal content of more than 0.5 ppm and/or a 2-trans-nonenal content of more than 0.05 ppm. The imparted butter flavour can hardly be distinguished from natural butter flavour. Compared with non-oxidized butterfat substantial less oxidized butterfat is required for obtaining the same flavour intensity.

European patent EP 0 377 239 describes the preparation of a flavour composition obtained by controlled oxidation of natural triglyceride fats in the presence of an anti-oxidant. The process yields products which have retained their original flavour, but considerably intensified, or so to say boosted. When starting with e.g. butter or butter oil the butter flavour is enhanced. When starting with peanut oil, controlled oxidation boosts the peanut flavour.

All known methods for the preparation of a flavouring composition using an oxidation treatment start from natural glyceride fats. Consequently, for the preparation of e.g. a butter flavour imparting composition, still butter or butter oil is used, which is an expensive starting material, as are other flavour bearing oils. Therefore cheaper alternative starting fats are much desired.

SUMMARY OF THE INVENTION

A flavouring composition has been found which is obtainable by oxidation of an oleochemical being a glyceride fat, fatty acid or fatty acid derivative, not being a dairy fat, which contains at least one poly-unsaturated fatty acid with an omega-3 non-conjugatable double bond system in an amount of >0.01 wt. % on fatty acids. Consequently the invention comprises a flavouring composition obtainable by oxidation of an oleochemical being a glyceride fat, fatty acid or fatty acid derivative, not being a dairy fat, characterized in that the oleochemical contains at least one poly-unsaturated fatty acid with an omega-3 non-conjugatable double bond system in an amount of >0.01 wt. %, preferably >0.1 wt. % on fatty acids.

Moreover, a method has been found for the preparation of such flavouring composition which comprises the use of a modified oleochemical being either natural glyceride fat, or fatty acid or fatty acid derivative. Therefore the invention comprises too a process for preparing a flavouring composition by subjecting an oleochemical being either natural glyceride fat, or fatty acid or fatty acid derivative to an oxidation treatment, characterised in that the oleochemical has been subjected to a treatment which causes the modification of the fatty acids composition, provided it contains at least one poly-unsaturated fatty acid with an omega-3 non-conjugatable double bond system. Such treatment particularly comprises hydrogenation, interesterification and fractionation.

In contrast to the mentioned prior art processes the process of the invention does not primarily boost the native flavour which is already present in the source fat to some degree, but generates an unexpected flavour which was not yet present in the source fat before the treatment. In particular a flavouring composition suitable for the flavouring of food compositions for which a butter-like flavour is desired can now be prepared by the oxidation of a bland soybean oil, which has been subjected to partial hydrogenation. The resulting flavour contains a characteristic sweet, creamy note which is highly appreciated in a butter flavour.

DETAILS OF THE INVENTION

Flavouring composition in the context of the present invention means any composition which can be used for flavouring a food composition, either alone or in admixture with other flavouring compositions, components or compounds with which it may form a flavour cocktail. Hence, the flavouring composition may be a sole compound or—more often—a mixture of several compounds, some of which may be present in trace amounts and which together, when applied in proper concentrations, are responsible for the desired flavour. The term flavour block is often used for a flavouring composition not being a single compound when it performs only properly after addition of one or more other flavouring compositions. 'Butter flavour' indicates a flavour which evokes the sensation of smelling and/or tasting true butter. It is not meant that the flavour imparted by a flavouring composition is necessarily identical in all aspects with the flavour of true butter (which is indicated with 'natural butter flavour'). One of the objects of the present invention is to provide a flavour block suitable for the preparation of a butter flavour.

Figure 1A:
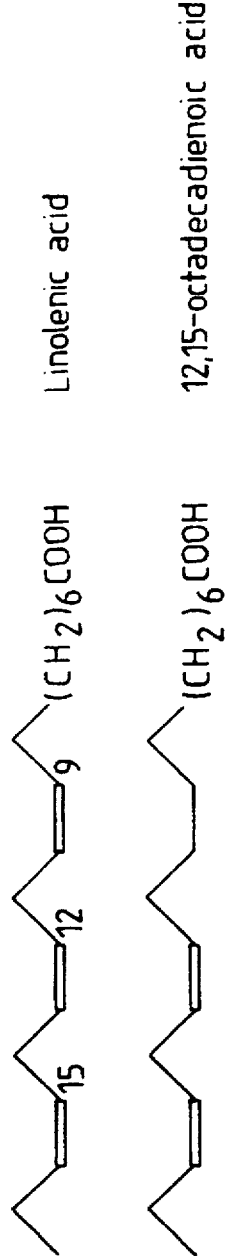
FIGS. 1a through 1c shows examples of omega-3 poly-unsaturated fatty acids with a chain length of 18 C-atoms and a conjugatable (1a), conjugated (1b) or non-conjugatable double bond system (1c), respectively.
Figure 1B:
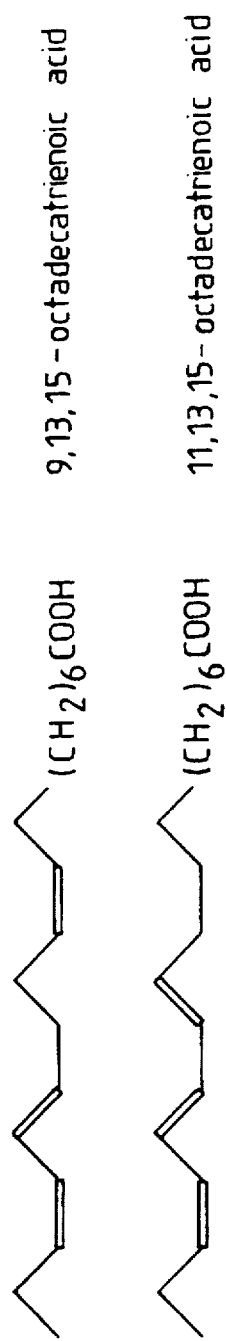
Figure 1C:
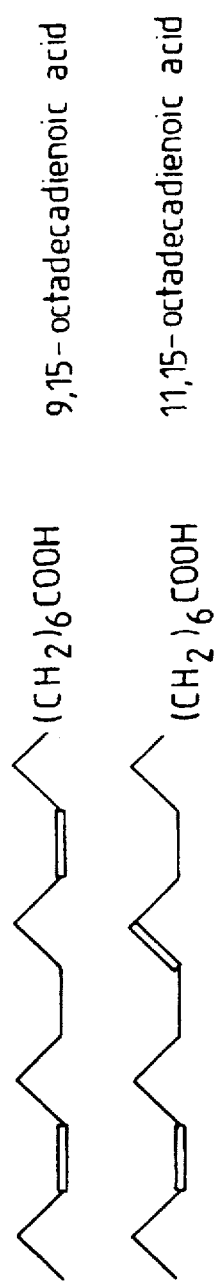
Figure 2A:
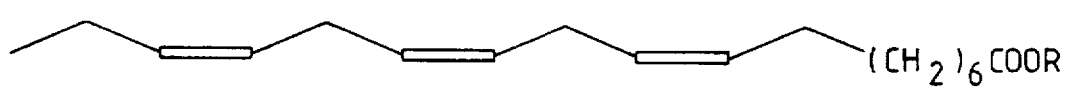
FIG. 2 shows a pathway for the formation of poly-unsaturated fatty acids with non-conjugatable double bonds during hydrogenation of poly-unsaturated fats and oils. Linolenic acid (A) is converted first to a positional isomer of linolenic acid (B) and then to a mixture of positional isomers of linoleic acid (C).
Figure 2B:
Figure 2C:
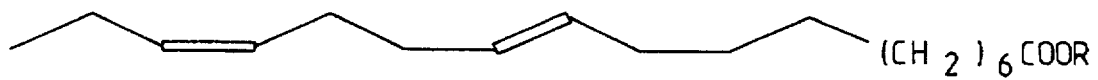
Figure 2C:

According to the present invention the glyceride fat which is used for the preparation of a flavouring substance essentially is a fat with a relatively high amount of poly-unsaturated fatty acids with an omega-3 non-conjugatable double bond system (for examples see FIG. 1). Such fatty acids should be present in an amount of >0.01 wt. % (unsaturation condition A). The preferred amount is >0.1 wt. % and an optimum amount is 1–5 wt. % on fatty acids.

Such fats have not been disclosed as starting material for the preparation of a flavouring composition. According to the invention, they can suitably be obtained by any treatment which results into a modification of the fat. Fat modification in the context of the present specification means that the composition of the fatty acids has been changed in comparison with the original fatty acids composition. Fat modification does not comprise any treatment such as fat hydrolysis which has no effect whatsoever on the fatty acid composition.

The fat modification should generate in a sufficient amount at least one poly-unsaturated fatty acid or fatty acid residue with an omega-3 non-conjugatable double bond system. Such double bond system contains at least two double bonds, one at the omega-3 position and all double bonds are separated by at least two methylene groups. Typical examples are 9,15-octadecadienoic acid, 10,15-octadecadienoic acid and 11,15-octadecadienoic acid in contrast to 9,13,15-octadecatrienoic acid and 11,13,15-octadecatrienoic acid, which contain an omega-3 double bond system which is conjugated and conjugatable. Oxidation of oils which contain such fatty acids residues surprisingly was found to result into a product with a sweet, creamy flavour note, which is highly appreciated in a flavour block used for composing a butter flavour.

The modification of the fatty acid composition of the triglyceride fat may be suitably effected by one or more of the following treatments: hydrogenation, interesterification and fractionation, provided a change in fatty acid composition results which particularly generates poly-unsaturated fatty acids with an omega-3 non-conjugatable double bond system.

Generally, hydrogenation aims at changing unsaturated fatty acids residues of glyceride fat into less unsaturated or saturated acids, e.g. linoleic acid into oleic acid or oleic acid into stearic acid. For obtaining a glyceride oil containing an increased amount of poly-unsaturated fatty acids with an omega-3 non-conjugatable double bond system the oil to be oxidized should contain a poly-unsaturated fatty acid which by hydrogenation can be turned into the poly-unsaturated fatty acids with an omega-3 non-conjugatable double bond system which is a necessary requirement for the effect of the invention. A pathway for formation of these fatty acids via hydrogenation is outlined in FIG. 2.

For modification of the fatty acid composition by hydrogenation a common hydrogenation method may be used. Not only chemical hydrogenation, using e.g. nickel, palladium or platinum catalysts, but also bio-hydrogenation, where the hydrogenation is accomplished in the presence of a hydrogenation enzyme.

Modification by way of interesterification comprises adding to the natural glyceride fat a source of fatty acids, e.g. free fatty acids or a different glyceride fat, and having the fatty acids of the natural fat at least partially exchanged with the added fatty acids. Any usual interesterification method may be used, including chemical and enzymatic interesterification.

Another way to modify the fatty acid composition is by fractionation, either dry fractionation or solvent fractionation of the natural glyceride fat, fatty acid or fatty acid derivative.

The term glyceride fat usually indicates a mixture mainly consisting of triglycerides. However, when not fully purified this fat may additionally contain considerable amounts of free fatty acids, mono- and diglycerides and phospholipids. Although applicants do not wish to be bound by theory, it is believed that the flavour imparting compounds be generated by decomposition of the unsaturated fatty acid moieties in the oleochemical. It is therefore immaterial whether the fatty acids as defined above are present as free molecules or are bound as a derivative, such as a mono-, di- or triglyceride. In free form as well as derivatized their carbon chains are broken down during the oxidation treatment, resulting into the flavouring composition of the invention. When employed as starting material in the present process a glyceride fat usually contains at least 60 wt. % triglycerides.

The terms fat and oil are used interchangeably. Any type of fat may be used, including animal fat and fish oil, but preferably vegetable fats are used, provided they contain a fatty acid which can act as precursor for the process of the invention. A precursor fatty acid is characterized in that it, after hydrogenation, delivers a fatty acid with an omega-3 non-conjugatable double bond system. Such fats are soybean oil, cottonseed oil, corn oil, rapeseed oil and linseed oil. Other vegetable oils such as sunflower oil, palm oil, palmkernel oil, arachide oil, olive oil and sesame oil and mixtures of these are less suitable because they do not contain a fatty acid which can act as precursors for the process of the invention and therefore cannot be used solely or only in admixture with the fats of the former category.

For the purpose of this invention the term fat comprises also sucrose fatty acid esters, which may be used as a low calorie replacement for a part or all of the triglyceride material.

The most advantageous way for obtaining a modification of the fatty acid composition is hydrogenation, for which any common method can be used. The hydrogenation should not proceed to full saturation otherwise the double bond system required for the subsequent oxidation process is no longer existent. Preferably the iodine value stays above 50. The optimum extent of hydrogenation depends on the nature of the fat and can easily be established by some trial experiments.

Although applicants do not wish to be bound by any theory it is believed that a partial hydrogenation treatment saturates the double bonds which during subsequent oxidation would cause the generation of off-flavours (see Table II).

For the oxidation process, preferably fats are chosen with a relatively low amount of poly-unsaturated omega-3 fatty acids with a conjugated or conjugatable double bond. Oxidation in the presence of such fatty acids may generate an awful green, oily off-flavour. Anyhow, the fat to be oxidized contains 0–5 wt. %, preferably 0–1 wt. % of such acids (unsaturation condition B). Percentages as usual are calculated on total fatty acids. Best results are obtained when the ratio of poly-unsaturated fatty acids with an omega-3 non-conjugatable double bond system and poly-unsaturated fatty acids with an omega-3 conjugated or conjugatable double bond system is >1 (unsaturation condition C).

According to a more preferred embodiment the hydrogenated fat is hydrogenated soybean oil which has a slip melting point of 30°–45° C., preferably of about 35° C. The oxidation treatment of this hydrogenated fat delivers a flavouring composition which may be used as a butter flavour block. When this flavour block, optionally after a proper dilution, is admixed with butter flavour compounds such as diacetyl, delta-lactones and methyl ketones a suitable butter flavour is obtained, which is very much alike natural butter flavour.

Figure 3:
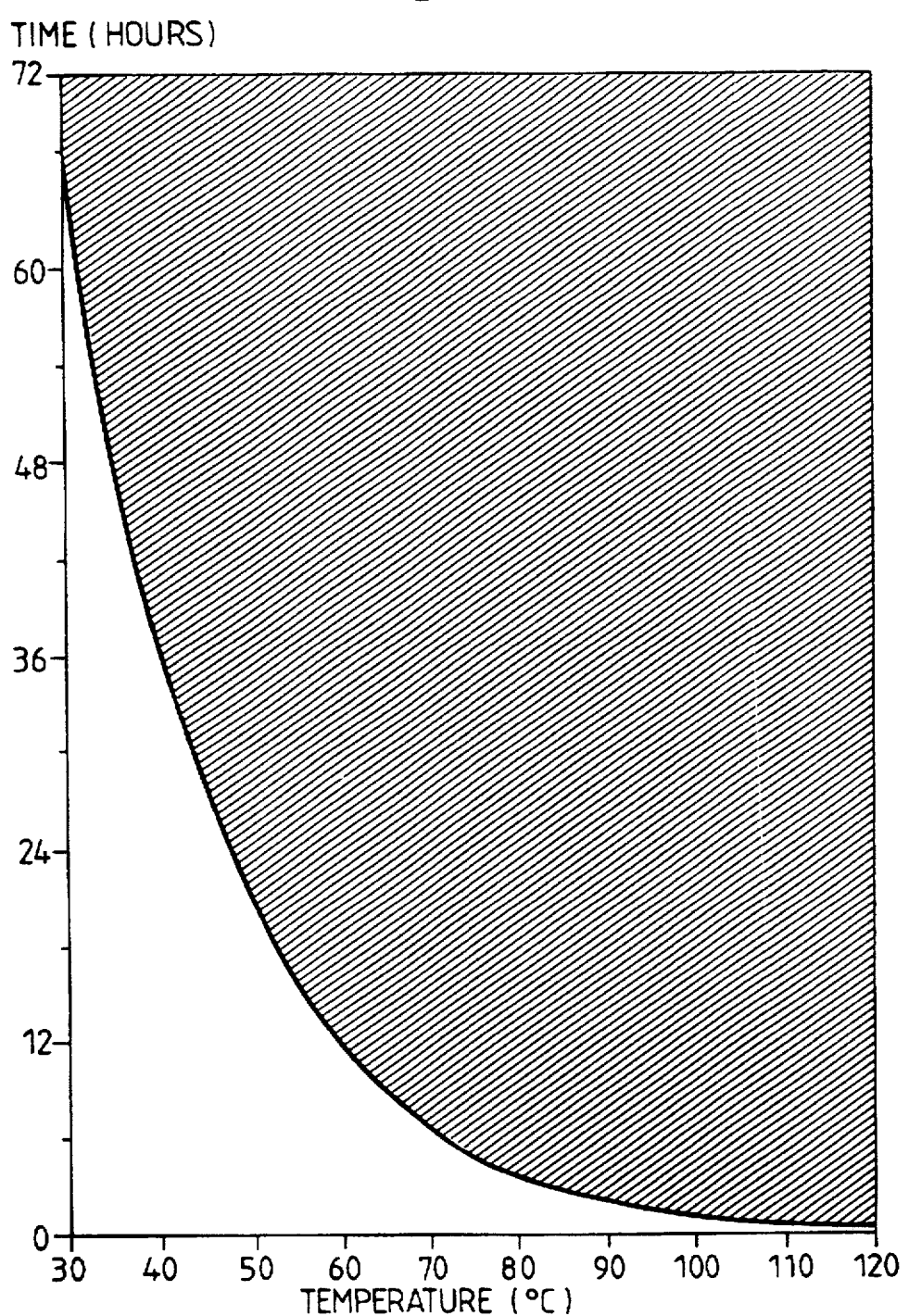
FIG. 3 illustrates the temperature dependence of the oxidation step. It shows a graph which indicates for each oxidation temperature the minimum reaction time in hours for development of a noticeable flavour.

The flavouring composition is obtained by exposing the above mentioned oleochemical with a specific fatty acid composition to oxygen, suitably to ambient air. Fat oxidation already occurs at ambient temperature, but the oxidation proceeds at an economic rate when the temperature is >50° C. Therefore, preferably, the process temperature is raised to >50° C. FIG. 3 shows the relationship between the temperature and the minimum heating period which is required for the development of a noticeable flavour. Generally the modified fat is heated for 0.5 hours –1 week at a temperature of 50°–150° C. A drawback of relatively high temperatures is that volatile compounds may escape from the reaction mixture.

At 50°–85° C. suitable heating times are 5–50 hours. Often good results are obtained within 8–36 hours. At about 100° C. one hour of heating often suffices. Good and reproducible results are obtained if the oxidation is carried out under reflux conditions. A temperature of 85°–95° C. provides a good compromise between sufficient reaction rate and controlled escape of volatile compounds.

The controlled oxidation treatment is preferably carried out in the presence of at least 2 wt. % water and at a temperature in the range of 50°–150° C. Obviously, when a process temperature higher than 100° C. is used, the pressure should be increased. If water is not already present in the starting materials it is added to the reaction mixture.

The presence of some salt during oxidation has a favourable effect on the flavour development. Preferably the reaction mixture contains 3–40 wt. % of cooking salt (calculated on water content).

The fat entering the oxidation process should be substantially free from compounds capable to enter in a Maillard reaction. In the context of this specification this means that the combined amounts of proteins and reducing sugars —if present —are not greater than 1 wt. %.

Preferably the oxidation treatment of the modified fat is a controlled oxidation treatment, which in this context means a process in which an anti-oxidant is present in such amount that one of the effects is a slight retardation of the oxidation. If the anti-oxidant is not a native anti-oxidant already present in the fat to be oxidized, it may be added.

The anti-oxidant may be either one single compound or a mixture of different compounds. Suitable anti-oxidants are:

(1) natural or nature-identical anti-oxidants such as tocopherols, tocotrienols, gum guaiac, nordihydroguairetic acid, ascorbic acid;

(2) synthetic anti-oxidants like butylated hydroxyanisole (BHA), butylated hydroxytoluene (BHT), tertiary butyl hydroxyquinone (TBHQ), trihydroxybutyrophenone, 4-hydroxymethyl-2,6-ditert.butylphenol, dilaurylthiodipropionate, gallates, anoxomer (a condensation product of BHA, BHT and TBHQ), ascorbyl palmitate;

(3) sequestrants such as tartaric acid, citric acid and ethylenediamine tetra-acetic acid (EDTA).

Preferably the anti-oxidant is selected from the group consisting of natural and nature-identical anti-oxidants, citric acid, tartaric acid and precursors thereof. The most preferred anti-oxidant is α-tocopherol and mixtures of tocopherols, which are commercially available. Alpha-tocopherol is commonly present as a native anti-oxidant in vegetable fat. About 0.1 wt. % (calculated on the fat) of alpha-tocopherol is sufficient for increasing the induction period of the fat by a factor of 1.5 (effective concentration). The induction period is established at 100° C., using the method described in J. Am. Oil. Chem. Soc. Vol. 63, 6 (1986), 192–195.

Generally, the effective concentration depends on the nature of the fat and on the nature of the anti-oxidant. The anti-oxidant may be admixed in an amount of 1–100 times the effective concentration. In case alpha-tocopherol is the only anti-oxidant present in the flavouring composition according to the invention, its concentration is at least 0.01 wt. %.

The present process aims at a mild oxidation of fat which in this context means that care is taken that the peroxide value of the fat after oxidation, which is usually at least 2, does not exceed 20. The peroxide value indicates the amount of peroxides present in the fat and is expressed in milliequivalent oxygen per kg fat. The way in which the peroxide value can be determined is described by P. G. Powick. J. Agric. Res. 26, 323 (1923).

Since the produced flavour compounds are rather volatile, the oxidation step is carried out preferably in an essentially closed system, i.e. a system from which such volatile compounds cannot escape. The term closed system in this context also includes reflux systems. A closed system ensures that the water as well as the generated volatile flavours present in the fat containing oxidation mixture do not escape by evaporation during the oxidation which may take quite a long time.

The present process may be followed by a step comprising recovery of the flavour volatiles present in the oxidized fat. Their isolation from the mixture may be effected, for instance, by distillation, supercritical gas extraction or solvent extraction. The volatiles are preferably recovered by means of distillation. The distillate contains a mixture comprising (C5-C12)-alkanals, (C5-C12)-2-alkenals and (C7-C12)-2,4-alkadienals. Alternatively, the volatiles can be distilled during the oxidation process. Then the heating helps both to speed up the oxidation and the evaporation of the flavour volatiles.

The invention also comprises the use of the flavouring composition of the invention for flavouring food products and the flavoured food products themselves. The flavour composition is incorporated solely or admixed with other flavour components into the food product, suitably in an amount of 0.001–10 wt. %, preferably 0.5–6 wt. % calculated on the food product.

Food products are understood to be: products which are suited and intended for human consumption, i.e. products which are non-toxic when consumed in normal amounts. A typical flavouring composition is a butter flavour block which is particularly suitable for flavouring spreads, non-dairy creams, confectionery, ice cream, syrups, bakery materials, bakery products, shortenings, gravies, soups, sauces, dressings and snacks, in general products which benefit from having a butter flavour.

The flavour composition commonly has a continuous fat phase and then can be added as such to a food composition having also a continuous fat phase such as margarine-and reduced-fat spreads. Alternatively the flavour composition may be emulsified into a water phase and then can be easily admixed with an emulsion type food composition, such as a cream, where water is also the continuous phase.

The obtained flavoured food product contains preferably 10–95 wt. % water and 5–90 wt. % fat (oxidized fat of the invention as well as non-oxidized fat). The total water and fat content comprises at least 70 wt. %. Such food products are e.g. high fat spreads, containing for instance 80 wt. % fat phase of which 3 wt. % oxidized fat, and low fat spreads containing for instance 40 wt. % fat of which 1 wt. % oxidized fat.

The non-oxidized fat present in the flavoured food product has a low peroxide value, preferably less than 2, more preferably less than 0.1. Furthermore, this non-oxidized fat generally has an anisidine value of less than 1 and a total oxidation value of less than 5. For determining the anisidine value see: IUPAC, Standard Methods for the Analysis of Oils, Fats and Derivatives, 6th Ed. (1979), Pergamon Press, Oxford, Method 2.504, page 143.

The total oxidation value (TOV) is calculated from the peroxide value (PV) and the anisidine value (AV):

$$TOV=2*PV+AV$$

See: J. Am. Oil. Chem. Soc. 51, 17 (1974) G. R. List et al.

The invention is illustrated by the following examples:

EXAMPLES 1–9

A butter flavour imparting composition, its preparation and organoleptical assessment Several vegetable oils were neutralised, bleached, and partially hydrogenated by subjecting the oils to an ordinary one step hydrogenation process until the slip melting point as indicated in Table I is reached.

The hydrogenation temperature, initially being 140° C., was increased to 185° C. Unless indicated otherwise (see table I), a nickel on silica catalyst was applied in a concentration which amounts to 0.3 wt. % nickel on oil. Table I shows the fatty acid composition of three natural oils and of each hydrogenated oil. The number after the oil name indicates the slip melting point.

Before oxidation the starting oil either natural or hydrogenated should be without taste or odour. Its peroxide value should be <1.0.

500 g of freshly refined oil was admixed with 0.2 g of a tocopherol mixture (ex Eisai Co., Ltd, 60% in oil, containing alpha-, gamma- and delta-tocopherols in a weight ratio of 1:3.13:3.46) and with 125 g of a 16 wt. % solution of salt in demineralised water. The emulsion was heated (93° C.) in a one-liter 3-necked-roundbottom flask equipped with a reflux condenser on an oil bath (108° C.) under continuous stirring. After 24 hours (example 6:48 hours) the salty aqueous phase was separated from the fat phase by centrifuging or decanting (if the oil became solid).

Analysis of the oil of example 3: The volatiles were collected from the oxidized fat using high vacuum degassing (1.33 mPa, 90° C., 5 hours) and analysed by gaschromatography:

TABLE I

| Example | Oil | fatty acid composition (%) | | | | |
|---|---|---|---|---|---|---|
| | | C18:3 | C18:2 | C18:1 total | omega-3 3) | C18:2 n.c. 2) |
| | BO | 7.7 | 53.0 | 22.8 | 8.0 | 0 |
| D | BO 25 | 0.3 | 18.7 | 51.6 | 2.4 | 0.4 |
| 1 | BO 32 low trans | 0.0 | 1.8 | 71.6 | 0.4 | 0.6 |
| 2 | BO 35 | 0.0 | 0.6 | 66.9 | 0.3 | 3.4 |
| 3 | BO 35 1) high trans | 0.0 | 0.2 | 74.1 | 0.4 | 3.0 |
| 4 | BO 36 low trans | 0.0 | 0.3 | 69.5 | 0.3 | 1.0 |
| 5 | BO 43 | 0.0 | 0.5 | 65.1 | 0.3 | 2.5 |
| 6 | BO 65 | 0.0 | 0.1 | 2.2 | 0.0 | 0.4 |
| | RP | 8.6 | 20.0 | 58.1 | n.d. | n.d. |
| 7 | RP 32 | 0.5 | 3.0 | 70.3 | n.d. | n.d. |
| 8 | RP 36 | 0.3 | 2.4 | 67.3 | n.d. | n.d. |

TABLE I-continued

| 9 | RP 44 | 0.1 | 0.8 | 53.5 | n.d. | n.d. |
|---|---|---|---|---|---|---|
| | PO | 0.3 | 10.1 | 38.5 | 0.3 | 0.0 |
| E | PO 45 | 0.0 | 1.0 | 42.5 | 0.0 | 0.0 |

BO = soybean oil  RP = rapeseed oil  PO = palm oil
1) hydrogenated with a sulphurized nickel on silica catalyst)
2) n.c. = non-conjugatable, term refers to polyunsaturated fatty acids in which the double bonds are separated by more than one methylene group.
3) total poly-unsaturated fatty acids with an omega-3 conjugated or conjugatable double bond system

| | µg/kg (ppb) |
|---|---|
| pentanal | 590 |
| hexanal | 720 |
| heptanal | 460 |
| octanal | 530 |
| nonanal | 570 |
| decanal | 440 |
| undecanal | 85 |
| dodecanal | 30 |
| 2-pentenal | 120 |
| 2-hexenal | 340 |
| 2-heptenal | 840 |
| 2-octenal | 1180 |
| 2-nonenal | 1340 |
| 2-decenal | 1615 |
| 2-undecenal | 1350 |
| 2-dodecenal | 460 |
| 2,4-heptadienal | 100 |
| 2,4-octadienal | 135 |
| 2,4-nonadienal | 700 |
| 2,4-decadienal | 2520 |
| 2,4-undecadienal | 430 |
| 2,4-dodecadienal | 40 |

For comparison purposes also fats not complying with the before mentioned unsaturation conditions were subjected to the above oxidation treatment (examples A, B, C, D and E).

Organoleptical assessment 4 wt. % of the oxidized oils and the comparison oils were dissolved in a bland oil (medium chain length triglyceride oil).

Samples of the diluted oils were assessed by a panel of ten margarine flavouring experts (see Table II). Besides the butter-likeness also a green, oily off-flavour was assessed and a sweet, creamy note which has a appreciated contribution to the butter flavour. Note that comparison example D shows a rather strong off-flavour. Although the oil has been subjected to hydrogenation, it does not comply with the unsaturation conditions B and C. Comparison example E does not show an off-flavour since condition B is complied with, but neither a positive flavour since condition A is not complied with.

TABLE II

Organoleptical assessment

| | | Sensorial Assessment[2] | | |
|---|---|---|---|---|
| Example | Oil | green oily[1] | sweet creamy | butter-likeness |
| A | BO | 5 | 1 | 1 |
| D | BO 25 | 4 | 2 | 1 |
| 1 | BO 32 low trans | 1 | 4 | 3 |
| 2 | BO 35 | 1 | 5 | 4 |

TABLE II-continued

Organoleptical assessment

| Exam ple | Oil | Sensorial Assessment[2] | | |
|---|---|---|---|---|
| | | green oily[1] | sweet creamy | butter- likeness |
| 3 | BO 35 high trans | 1 | 5 | 4 |
| 4 | BO 36 low trans | 1 | 4 | 3 |
| 5 | BO 43 | 1 | 5 | 4 |
| 6 | BO 65[3] | 1 | 2 | 1 |
| B | RP | 5 | 1 | 1 |
| 7 | RP 32 | 1 | 4 | 3 |
| 8 | RP 36 | 1 | 5 | 4 |
| 9 | RP 44 | 1 | 5 | 4 |
| C | PO | 4 | 1 | 1 |
| E | PO 45 | 1 | 2 | 2 |

[1] off-flavour
[2] mean scores (n = 10); arbitrary scale from 1 = weak to 5 = strong
A, B and C are comparison examples for BO, RP and PO oils which have not been hydrogenated.
D and E are hydrogenated soybean oil and palm oil resp. which do not comply with the unsaturation conditions
[3] fully hardened bean oil, containing about 0.4 wt. % polyunsaturated fatty acids.

EXAMPLE 10

Preparation of croissants using oxidized hydrogenated soybean oil as a flavour composition A bakery margarine for croissants (a so-called Danish pastry margarine) was prepared using a Votator™ (scraped heat exchanger) with an aqueous phase (17 wt. %) consisting of (wt. %):

| 86% | demineralized water |
| 2.4% | modified starch |
| 5.5% | salt |
| 5.5% | saccharose |
| 0.4% | citric acid |
| 0.2% | potassium sorbate |
| 8 ppm | diacetyl | and a fat phase (83 wt. %) consisting of:

40% hardened palmoil (m.p. 42° C.)

30% hardened rapeseed oil (m.p. 32° C.)

11% soyabean oil

15% lard

4% flavouring oil of example 2

Croissants were prepared from a dough of the following composition:

1000 g flour 40 g bakers yeast 25 g salt 100 g saccharose 300 g water 300 g milk The dough was kneaded. After this had been done it was put into a tin and covered in order to prevent crusting. For fermenting, the dough was kept at room temperature for one hour. Then the dough was broken and put into a refrigerator and kept there overnight. The dough was then cut into pieces. For turning the dough, a piece was spread out in a rectangle and half of it was covered with 500 g of the margarine which previously has been tempered. Then the spread dough was folded in two, covering the margarine and joining the edges. It was then given a turn, folded in three and thereafter a turn folded in four (that means a simple turn and a double turn). The dough was rolled to a thickness of about 3 mm.

For shaping, the dough was cut into strips of 20 cm width and divided into triangles of 40 to 50 g of dough. The croissants were cut in very lengthened triangles having a height of 18 to 20 cm and a base of 9 to 10 cm. They were then rolled up several times around themselves.

For further fermentation, the croissants were allowed to rise at 30°–35° C. under the shelter of the draught or in a prover Baking was carried out briskly (at about 250° C.) without any damp for about twelve minutes. The croissants were washed twice with eggs, and still once before the last fermentation.

Comparison Example F

Example 10 was repeated but the margarine was prepared using the oxidized butter fat prepared according to example 1 of EP 0 377 239 instead of the oil of example 2 of the present specification.

Organoleptical assessment

A panel of ten flavour experts compared both the croissants prepared according to example 10 and the croissants prepared according to the comparison example F with ordinary croissants prepared with real butter as the standard. Both types of croissants (examples 10 and D) received a good appreciation from the panel, but the score of the former croissants was slightly higher than the score of the latter croissants.

EXAMPLE 11

Preparation of puff-pastry sticks using oxidized hydrogenated soybean oil as a flavour composition A bakery margarine for croissants (a so-called Danish pastry margarine) was prepared using a Votator with an aqueous phase (17 wt. %) consisting of (wt. %):

| 86% | demineralized water |
| 2.4% | modified starch |
| 5.5% | salt |
| 5.5% | saccharose |
| 0.4% | citric acid |
| 0.2% | potassium sorbate |
| 8 ppm | diacetyl |
| 16 ppm | 1:1 mixture of δ-decalactone and δ-dodecalactone |
| 1 ppm | 1:1:1 mixture of 2-pentanone, 2-heptanone and 2-nonanone | and a fat phase (83 wt. %) consisting of:

40% hardened palmoil (m.p. 42° C.

30% hardened rapeseed oil (m.p. 32° C.)

13% soyabean oil

15% lard

2% flavouring oil of example 2

Using the following ingredients 500 g flour (Columbus™, ex Meneba)

260 g water 200 g margarine 300 g margarine for turning the following procedure (Scottish/Dutch method) was used for preparing puff-pastry sticks:

give flour, water and the predough margarine 200 turns in Diosna kneading machine allow the dough to rest for 10 minutes roll out the dough to a thickness of 5 mm press and spread out the margarine onto the mass by hand give the dough two turns in three, followed by 20 minutes rest repeat the latter procedure two times roll the mass to 3 mm thickness and cut it to 12×2 cm sticks bake it at 200° C.

Comparison Example G

Example 11 was repeated but the margarine was prepared using the oxidized butter fat prepared according to example 1 of EP 0 377 239 instead of the oil of example 2 of the present specification.

Organoleptical assessment

A panel of ten flavour experts compared both the puff pastry sticks prepared according to example 11 and the croissants prepared according to the comparison example G with ordinary puff pastry sticks prepared with real butter as the standard. Both types of puff pastry sticks (examples 11 and E) received a good appreciation from the panel, but the score of the former puff pastry sticks (example 11 was slightly higher than the score of the latter puff pastry sticks (example G).

We claim:

1. Flavouring composition obtained by oxidation of a fatty acid or fatty acid derivative or mixtures of them, not being a dairy fat, wherein the fatty acid comprises at least one poly-unsaturated fatty acid with an omega-3 non-conjugatable double bond system in an amount of >0.01 wt. % on fatty acids.

2. Flavouring composition according to claim 1, characterized in that the fatty acid comprises at least one fatty acid selected from the group comprising 9,15-octadecadienoic acid, 10,15-octadecadienoic acid and 11,15-octadecadienoic acid.

3. Flavouring composition according to claim 1, characterized in that the fatty acid or fatty acid derivative contains 0–5 wt. % (on fatty acids) of fatty acids with an omega-3 conjugated or conjugatable double bond system.

4. Flavouring composition according to claim 1 with a fatty acid composition which is characterized in that the weight ratio of poly-unsaturated fatty acids with an omega-3 non-conjugatable double bond system and poly-unsaturated fatty acids with an omega-3 conjugated or conjugatable double bond system is >1.

5. Use of the flavouring composition according to claim 1 for the flavouring of food products.

6. Food product flavoured by the flavouring composition according to claim 1.

7. Flavouring composition obtained by oxidation of a natural glyceride fat which has been subjected to a treatment which has modified the fatty acids composition of the glyceride fat.

8. Flavouring composition according to claim 7, where the modification treatment comprises hydrogenation, interesterification and fractionation.

9. Flavouring composition according to claim 7 suitable for use as a butter flavour block in food compositions and obtained by oxidation of a soybean oil which has been hydrogenated to a slip melting point of 30°–45° C.

10. Process for preparing a flavouring composition by subjecting a natural glyceride fat or a fatty acid or a fatty acid derivative to an oxidation treatment, characterized in that the natural glyceride fat or fatty acid or fatty acid derivative is a natural fat which has been subjected to a treatment which has modified the fatty acids composition.

11. Process according to claim 10, characterized in that the modification treatment results into an increase of poly-unsaturated fatty acids with an omega-3 non-conjugatable double bond system until to at least 0.01 wt. % on fatty acids.

12. Process according to claim 10, characterized in that the modification treatment delivers a product with a fatty acid composition with 0–5 wt. % of fatty acids with an omega-3 conjugated or conjugatable double bond system.

13. Process according to claim 10, characterized in that the modification treatment delivers a product with a fatty acid composition where the weight ratio of poly-unsaturated fatty acids with an omega-3 non-conjugatable double bond system and poly-unsaturated fatty acids with an omega-3 conjugated or conjugatable double bond system is >1.

14. Process according to according to claim 10, characterized in that the natural glyceride fat or fatty acid or fatty acid derivative has been subjected to a hydrogenation treatment.

15. Process according to claim 14, characterized in that the natural glyceride fat or fatty acid or fatty acid derivative has been hydrogenated to an iodine value not below 50.

16. Process according to claim 14, characterized in that the fat is soybean oil hydrogenated to a slip melting point of 30°–45° C.

17. Process according to claim 10, characterized in that the natural glyceride fat or fatty acid or fatty acid derivative has been subjected to an interesterification treatment.

18. Process according to claim 10, characterized in that the natural glyceride fat or fatty acid or fatty acid derivative has been subjected to a fractionation treatment.

19. Process according to claim 10, characterized in that the natural fat is taken from the group comprising soybean oil, rapeseed oil, cottonseed oil, corn oil and sesame oil and mixtures of them.

20. Process according to claim 10, characterized in that the modified fat or fatty acid or fatty acid derivative is oxidized by heating under access of oxygen.

21. Process according to claim 20, characterized in that the modified fat or fatty acid or fatty acid derivative is oxidized in the presence of an anti-oxidant which has been mixed with the modified fat in a concentration which is sufficient to increase the induction period of the fat by a factor of at least 1.5.

22. Process according to claim 20, characterized in that the modified fat or fatty acid or fatty acid derivative is heated for 0.5 hours–1 week at a temperature of 50°–150° C.

23. Process according to claim 20, characterized in that the modified fat is heated in the presence of water at a temperature of 50°–150° C.

24. Process according to claim 20, characterized in that the starting material is substantially free from proteins and reducing sugars which are capable to enter in a Maillard reaction.

25. Process according to claim 24, characterized in that the combined amounts of proteins and reducing sugars capable to enter in a Maillard reaction are not greater than 1 wt. %.

26. Use of the flavouring composition obtained by the process according to claim 10 for the flavouring of food products.

27. Food product flavoured by the flavouring composition obtained by the process according to claim 10.

* * * * *